US012565565B2

(12) United States Patent
Saito et al.

(10) Patent No.: US 12,565,565 B2
(45) Date of Patent: Mar. 3, 2026

(54) RESIN COMPOSITION, SELF-FUSING INSULATED ELECTRIC WIRE AND WIRE BUNDLE

(71) Applicants: SUMITOMO ELECTRIC INDUSTRIES, LTD., Osaka (JP); SUMITOMO ELECTRIC WINTEC, INC., Koka (JP)

(72) Inventors: Hideaki Saito, Osaka (JP); Shigenori Homma, Osaka (JP); Jun Sugawara, Koka (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 665 days.

(21) Appl. No.: 17/918,722

(22) PCT Filed: Jun. 11, 2021

(86) PCT No.: PCT/JP2021/022242
§ 371 (c)(1),
(2) Date: Oct. 13, 2022

(87) PCT Pub. No.: WO2021/256390
PCT Pub. Date: Dec. 23, 2021

(65) Prior Publication Data
US 2023/0250234 A1 Aug. 10, 2023

(30) Foreign Application Priority Data
Jun. 16, 2020 (JP) .................................. 2020-104056

(51) Int. Cl.
*C08G 75/23* (2006.01)
*C08G 59/24* (2006.01)
(Continued)

(52) U.S. Cl.
CPC ........... *C08G 75/23* (2013.01); *C08G 59/245* (2013.01); *C08G 59/4021* (2013.01);
(Continued)

(58) Field of Classification Search
CPC .. C08G 75/23; C08G 59/245; C08G 59/4021; C08G 65/4056; C08J 9/42;
(Continued)

(56) References Cited

U.S. PATENT DOCUMENTS

2013/0220674 A1 8/2013 Amou et al.

FOREIGN PATENT DOCUMENTS

JP H04-087214 A 3/1992
JP 2008-248240 A 10/2008
(Continued)

*Primary Examiner* — David T Karst
(74) *Attorney, Agent, or Firm* — Oliff PLC

(57) ABSTRACT
A resin composition includes a phenoxy resin as a principal component. The phenoxy resin has a weight-average molecular weight of 40,000 or more. The phenoxy resin has, in the same or different molecules, a first structural unit derived from bisphenol S phenoxy and a second structural unit derived from a bisphenol epoxy other than the first structural unit. A content ratio of the first structural unit in the phenoxy resin is 20 mol % to 80 mol % relative to a total content of the first structural unit and the second structural unit constituting the phenoxy resin.

11 Claims, 3 Drawing Sheets

(51) Int. Cl.

| | | |
|---|---|---|
| *C08G 59/40* | (2006.01) | |
| *C08G 65/40* | (2006.01) | |
| *C08J 9/42* | (2006.01) | |
| *H01B 3/30* | (2006.01) | |
| *H01F 5/06* | (2006.01) | |

(52) U.S. Cl.
CPC ............ *C08G 65/4056* (2013.01); *C08J 9/42* (2013.01); *H01B 3/30* (2013.01); *H01F 5/06* (2013.01); *C08J 2203/22* (2013.01); *C08J 2363/02* (2013.01); *C08J 2381/06* (2013.01)

(58) Field of Classification Search
CPC ............... C08J 2203/22; C08J 2363/02; C08J 2381/06; H01B 3/30; H01F 5/06
USPC ........................................................ 528/171
See application file for complete search history.

(56) References Cited

FOREIGN PATENT DOCUMENTS

| JP | 2009-099557 A | 5/2009 |
|---|---|---|
| JP | 2012-087246 A | 5/2012 |
| JP | 2013-170267 A | 9/2013 |
| JP | 2017-128667 A | 7/2017 |
| WO | 2019/102929 A1 | 5/2019 |

RESIN COMPOSITION, SELF-FUSING INSULATED ELECTRIC WIRE AND WIRE BUNDLE

TECHNICAL FIELD

The present disclosure relates to a resin composition, a self-fusing insulated electric wire, and a wire bundle. This application claims priority based on Japanese Patent Application No. 2020-104056 filed on Jun. 16, 2020, and the entire contents of the Japanese patent application are incorporated herein by reference.

BACKGROUND ART

When manufacturing a coil for a motor, for example, using an insulated electric wire, it is common to wind an electric wire around a core and then impregnate a varnish into a gap between turns of the electric wire and a gap between the wound electric wire and the core to adhere the turns of the electric wire to each other, and to adhere the wound electric wire to the core. However, it is difficult to ensure complete impregnation of the varnish, and the adhesion of the electric wire may be insufficient in some portions. In addition, the impregnation of the varnish increases the man-hours required and may make the coil more expensive.

On the other hand, in order to simplify a motor manufacturing process, a self-fusing insulated electric wire in which a heat fusion layer to be fused to each other is formed on an outer periphery of a conductor may be used. When such a self-fusing insulated electric wire is used, when a winding density of the electric wire is low, fusion between the turns of the electric wire or between the electric wire and the core may be insufficient. When the heat fusion layer is thickened in order to improve a fusion property, a density of a winding wire may be lowered, so that a volumetric efficiency of the coil may be lowered. In addition, since a coating thickness of the electric wire is increased, workability when the electric wire is inserted into the motor may be deteriorated.

Therefore, a technique has been proposed in which a blowing agent is added to the heat fusion layer to foam the heat fusion layer after the winding process, thereby improving the fusion property between electric wires (see Japanese Unexamined Patent Application Publication No. H04-087214).

CITATION LIST

Patent Literature

PTL 1: Japanese Unexamined Patent Application Publication No. H04-087214

SUMMARY OF INVENTION

A resin composition according to an aspect of the present disclosure is a resin composition including a phenoxy resin as a principal component. The phenoxy resin has a weight-average molecular weight of 40,000 or more. The phenoxy resin has, in the same or different molecules, a first structural unit derived from bisphenol S phenoxy and a second structural unit derived from a bisphenol epoxy other than the bisphenol S phenoxy. A content ratio of the first structural unit in the phenoxy resin is 20 mol % to 80 mol % relative to a total content of the first structural unit and the second structural unit constituting the phenoxy resin.

DESCRIPTION OF EMBODIMENTS

Figure 1:
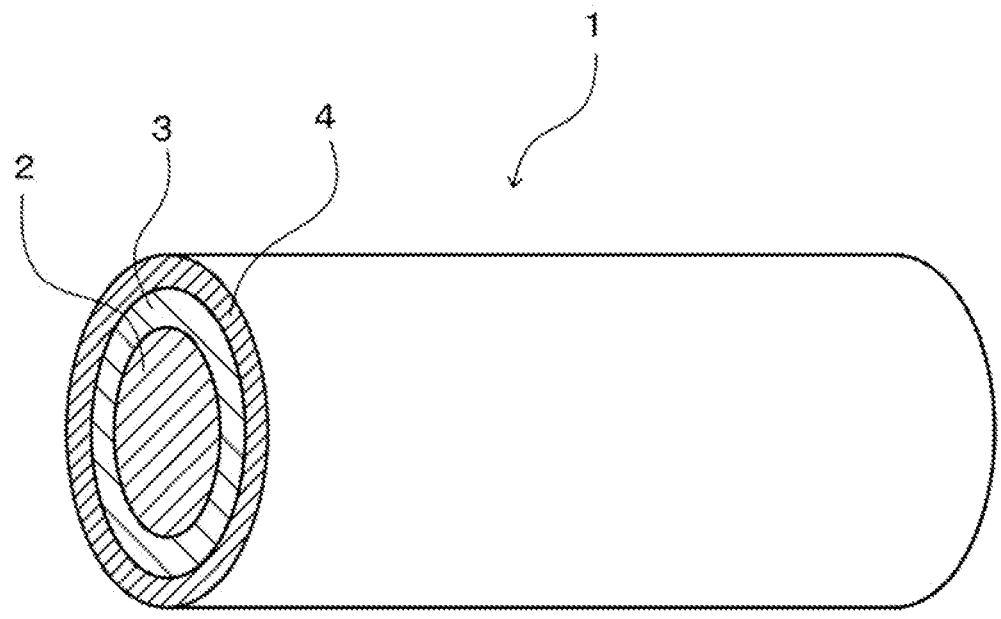
FIG. 1 is a perspective view illustrating a self-fusing insulated electric wire according to an embodiment of the present disclosure.
Figure 2:
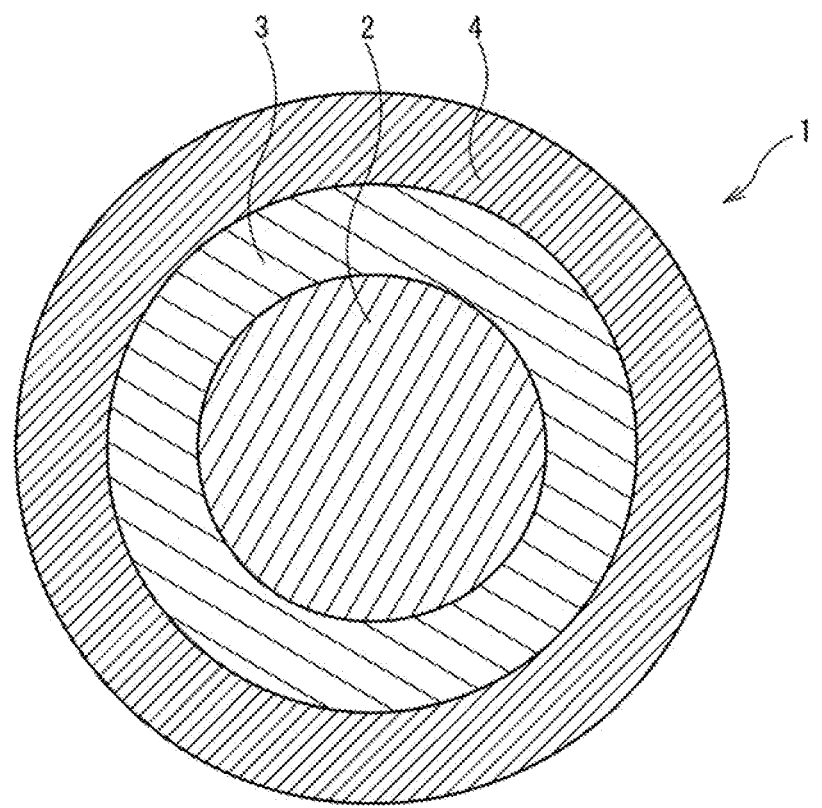
FIG. 2 is a schematic cross-sectional view illustrating a self-fusing insulated electric wire according to an embodiment of the present disclosure.

[Problems to be Solved by Present Disclosure]

In the self-fusing insulated electric wire disclosed in PTL 1, the heat fusion layer is fluidized during expansion, so that an effect of facilitating adhesion between electric wires can be obtained. However, since the heat fusion layer is excessively fluidized, the distribution of the fusion resin becomes partially non-uniform. As a result, the distance between the electric wires varies, and an effect of improving an insulation voltage, that is, a partial discharge inception voltage (hereinafter, also referred to as "PDIV") which can be originally expected by using the self-fusion layer may be insufficiently exhibited in some cases.

[Advantageous Effects of Present Disclosure]

The present disclosure has been made in view of the above circumstances, and an object of the present disclosure is to provide a resin composition, a self-fusing insulated electric wire, and a wire bundle having a high insulation property after fusion.

[Description of Embodiments of Present Disclosure]

First, embodiments of the present disclosure will be listed and described.

(1) A resin composition according to an embodiment of the present disclosure is a resin composition including a phenoxy resin as a principal component. The phenoxy resin has a weight-average molecular weight of 40,000 or more. The phenoxy resin has, in the same or different molecules, a first structural unit derived from bisphenol S phenoxy and a second structural unit derived from a bisphenol epoxy other than the bisphenol S phenoxy. A content ratio of the first structural unit in the phenoxy resin is 20 mol % to 80 mol % relative to a total content of the first structural unit and the second structural unit constituting the phenoxy resin. In the present specification, the "principal component" refers to a component having the largest content, and generally refers to a component of 50 mass % or more. According to the aspect of the disclosure described in (1), the resin composition can form a heat fusion layer having an excellent insulation property after fusion.

(2) The resin composition according to the above-described (1) may have an elastic modulus E1 at 60° C. in a state before curing treatment of 0.5 MPa or more and an elastic modulus E2 at 100° C. in a state before curing treatment of less than 2.0 MPa. According to the aspect of the disclosure described in (2), the resin composition can form a heat fusion layer having a more excellent insulation property after fusion.

(3) The resin composition according to the above-described (1) or (2) may further include a blowing agent. According to the aspect of the disclosure described in (3), the resin composition can form a heat fusion layer having a more excellent insulation property after fusion.

(4) The resin composition according to any one of the above-described (1) to (3) may further include an organic solvent. According to the aspect of the disclosure described in (4), the resin composition can be suitably used as a resin varnish.

(5) A self-fusing insulated electric wire according to an aspect of the present disclosure includes a linear conductor, an insulating layer covering an outer peripheral surface of the conductor, and a heat fusion layer covering an outer peripheral surface of the insulating layer. The heat fusion layer is composed of the resin composition according to any one of the above-described (1) to (4). According to the aspect of the disclosure described in (5), since the self-fusing insulated electric wire has the configuration described above, the self-fusing insulated electric wire has an excellent insulation property after fusion.

(6) A wire bundle according to an aspect of the present disclosure is a wire bundle formed by winding and bundling the self-fusing insulated electric wires according to the above-described (5). According to the aspect of the disclosure described in (6), since the wire bundle has the configuration described above, the wire bundle has an excellent insulation property after fusion.

[Details of Embodiments of Present Disclosure]

Hereinafter, a resin composition, a self-fusing insulated electric wire, and a wire bundle according to an embodiment of the present disclosure will be described in detail with reference to the drawings as appropriate.

<Self-Fusing Insulated Electric Wire>

A self-fusing insulated electric wire 1 shown in FIGS. 1, 2, 4 and 5 includes a linear conductor 2, an insulating layer 3 covering an outer peripheral surface of conductor 2, and a heat fusion layer 4 covering an outer peripheral surface of insulating layer 3. Heat fusion layer 4 is composed of a self-fusing resin composition to be described later.

[Conductor]

Conductor 2 is a linear metallic body that serves for electric conduction in self-fusing insulated electric wire 1. Examples of conductor 2 include a round wire having a circular cross-sectional shape, a square wire having a round-cornered square cross-sectional shape, and a rectangular wire having a round-cornered rectangular cross-sectional shape. Furthermore, conductor 2 may be a single linear body as shown in FIGS. 1, 2, 4, and 5, or may be a stranded wire body in which a plurality of thin wires are stranded.

Examples of a material used for conductor 2 include a metal such as copper, aluminum, nickel, silver, or iron, and an alloy thereof. In view of electric conductivity and workability, copper or aluminum may be used. Further, conductor 2 may have a multilayer structure in which a coating film made of another metal is laminated on an outer peripheral surface of the linear metallic body.

A lower limit of an average cross-sectional area of conductor 2 is usually 0.01 mm$^2$. When the average cross-sectional area of conductor 2 is less than the lower limit, an electrical resistance of conductor 2 may increase, so that heat generation when self-fusing insulated electric wire 1 is used may increase. The lower limit of the average cross-sectional area of conductor 2 may be 0.1 mm$^2$. The heat generation when self-fusing insulated electric wire 1 is used can be suppressed. On the other hand, an upper limit of the average cross-sectional area of conductor 2 is usually 100 mm$^2$. When the average cross-sectional area of conductor 2 exceeds the upper limit, the cross-sectional area of self-fusing insulated electric wire 1 increases, so that a coil or the like manufactured using self-fusing insulated electric wire 1 may increases in size. The upper limit of the average cross-sectional area of conductor 2 may be the 50 mm$^2$. The coil or the like to be manufactured can be further miniaturized. Here, the average cross-sectional area refers to an average value of cross-sectional areas in arbitrary five cross-sectional views.

[Insulating Layer]

Insulating layer 3 is a coating layer that covers the outer peripheral surface of conductor 2, and has an insulating property. Insulating layer 3 is directly laminated on the outer peripheral surface of conductor 2 in FIGS. 1, 2, 4, and 5. However, insulating layer 3 may be laminated over the outer peripheral surface of conductor 2, and another layer may be laminated between conductor 2 and insulating layer 3.

Insulating layer 3 is formed of a resin composition containing a thermosetting resin, a thermoplastic resin, or a mixture thereof as a principal component. Examples of the thermosetting resin used include, for example, polyvinyl formal, thermosetting polyurethane, thermosetting acrylic, epoxy, thermosetting polyester, thermosetting polyesterimide, thermosetting polyesteramideimide, aromatic polyamide, thermosetting polyamide-imide, thermosetting polyimide and the like. Examples of the thermoplastic resin used, for example, thermoplastic polyimide, polyphenyl sulfone, polyphenylene sulfide, polyetherimide, polyether ether ketone, polyether sulfone and the like. As needed, a curing agent may be added to insulating layer 3. As such a curing agent, a curing agent that is cured by heating is used. Examples of the curing agent include isocyanate compounds, epoxy compounds, dicyandiamide, boron trifluoride amine complexes, cyanate resins, ester-imide resins, phenol resins, urethane resins, unsaturated ester resins, urea resins, and imide resins. These may be used alone or in combination of two or more thereof.

A lower limit of an average thickness of insulating layer 3 is usually 5 μm. When the average thickness of insulating layer 3 is less than the lower limit, insulating layer 3 may have an insufficient strength. The lower limit of the average thickness of insulating layer 3 may be 10 μm. On the other hand, an upper limit of the average thickness of insulating layer 3 is usually 250 μm. When the average thickness of insulating layer 3 exceeds the upper limit, a space factor of a coil formed of self-fusing insulated electric wire 1 may be reduced. The upper limit of the average thickness of insulating layer 3 may be 200 μm. Here, the average thickness refers to an average value of thicknesses at arbitrary five positions in one cross-sectional view.

Insulating layer 3 is formed by applying a solution obtained by dissolving the above-described resin composition in a volatile solvent to the outer peripheral surface of conductor 2, and then heating the solution to volatilize the solvent and also cure the resin composition.

[Heat Fusion Layer]

Heat fusion layer 4 is an adhesive layer for connecting self-fusing insulated electric wire 1 to another adjacent object, and is disposed so as to cover the outer periphery of insulating layer 3. Heat fusion layer 4 has a self-fusing property in which heat fusion layers 4 are fused to each other. Heat fusion layer 4 is laminated on the outer peripheral surface of insulating layer 3 in FIGS. 1 and 2. However, heat fusion layer 4 may be laminated over the outer peripheral surface of insulating layer 3, and another layer may be laminated between insulating layer 3 and heat fusion layer 4. Heat fusion layer 4 preferably constitutes an outermost layer of self-fusing insulated electric wire 1.

A lower limit of the average thickness of heat fusion layer 4 is usually 10 μm. When the average thickness of heat fusion layer 4 is less than the lower limit, an adhesion force between self-fusing insulated electric wire 1 and another adjacent object may become insufficient. The lower limit of the average thickness of heat fusion layer 4 may be 15 μm, or may be 20 μm. The adhesion force between self-fusing insulated electric wire 1 and the other adjacent object can be increased. On the other hand, an upper limit of the average thickness of heat fusion layer 4 is usually 150 μm. When the average thickness of heat fusion layer 4 exceeds the upper limit, the space factor of the coil formed of self-fusing insulated electric wire 1 may be reduced. The upper limit of the average thickness of heat fusion layer 4 may be 125 μm, or may be 100 μm.

Heat fusion layer 4 is formed by applying a solution obtained by dissolving raw materials of a resin composition described below in a volatile solvent to the outer peripheral surface of insulating layer 3, and then heating the solution to volatilize the solvent and also adhere the resin composition in a dried state. That is, heat fusion layer 4 is composed of the resin composition which is not subjected to curing treatment and in which the solvent has been volatilized.

<Resin Composition>

The resin composition according to the present disclosure contains a phenoxy resin as a principal component. The resin composition may contain one or two or more phenoxy resins. The resin composition may contain other components in addition to the phenoxy resin.

(Phenoxy Resin)

A lower limit of a weight-average molecular weight of the phenoxy resin is usually 40,000. When the weight-average molecular weight of the phenoxy resin is less than the lower limit, fluidity of the phenoxy resin becomes excessively high during fusion of heat fusion layer 4, so that an insulation property after the fusion becomes insufficient. The lower limit of the weight-average molecular weight may be 50,000. On the other hand, an upper limit of the weight-average molecular weight of the phenoxy resin is usually 120,000. When the weight-average molecular weight of the phenoxy resin exceeds the upper limit, the fluidity may become excessively low during the fusion of heat fusion layer 4. Further, when the weight-average molecular weight of the phenoxy resin is within the above range, crazing of the heat fusion layer can be suppressed. The upper limit of the weight-average molecular weight may be 100,000.

Here, the weight-average molecular weight of the phenoxy resin refers to a value measured as a molecular weight in terms of standard polystyrene using an "eAliance GPC System (e2695)" manufactured by Waters Corporation with a "WATERS GURAD COL DMF" as a guard column, a "WATERS STYRAGELHR4E/HR5E" connected in series as a separation column, N-methyl-2-pyrrolidone (NMP) as a developing solvent at a column temperature of 40° C., and a flow rate of 0.5 mL/min.

The phenoxy resin has, in the same or different molecules, a first structural unit derived from bisphenol S phenoxy and a second structural unit derived from a bisphenol epoxy other than the bisphenol S phenoxy.

Examples of the second structural unit include structural units derived from, for example, bisphenol A phenoxy, bisphenol F phenoxy, modified phenoxy, and the like. The second structural unit may be derived from two or more kinds of bisphenol epoxy.

A lower limit of a content ratio of the first structural unit in the phenoxy resin may be 20 mol % or may be 25 mol % relative to a total content of the first structural unit and the second structural unit constituting the phenoxy resin. Further, an upper limit of the content ratio of the first structural unit in the phenoxy resin is 80 mol %, and may be 75 mol %. When the content ratio of the first structural unit is within the above range, heat fusion layer 4 having a more excellent insulating property after fusion can be formed.

A lower limit of a content of the phenoxy resin in the resin composition is usually 50 mass %. When the content is less than the lower limit, fluidity of the resin composition during fusion may be insufficient. The lower limit of the content of the phenoxy resin may be 55 mass % or may be 60 mass %. The fluidity of the resin composition during the fusion can be improved. An upper limit of the content of the phenoxy resin in the resin composition is usually 95 mass %. When the content rate exceeds the upper limit, heat resistance at high temperatures may be insufficient. The lower limit of the content of the phenoxy resin may be 90 mass % or may be 85 mass %. The heat resistance at high temperatures can be improved.

Examples of the other components include a curing agent, a blowing agent, an organic solvent, and the like. The resin composition may contain one or two or more other components.

The curing agent is a thermosetting curing agent or a latent curing agent. Examples of the curing agent include thermosetting compounds such as polyfunctional epoxy compounds, cyanate resins, ester-imide resins, phenol resins, urethane resins, unsaturated ester resins, urea resins, and imide resins, and combinations thereof. Here, the polyfunctional epoxy compound refers to a compound having three or more epoxy groups in one molecule. Examples of the polyfunctional epoxy compound include epoxy compounds having three or four epoxy groups in one molecule, such as phenol novolac type epoxy resins, cresol novolac type epoxy resins, triphenylmethane type epoxy resins, diphenyl sulfone type epoxy resins, and triazine ring type epoxy resins.

Examples of the blowing agent include chemical blowing agents, thermally expandable microcapsules, and thermally decomposable particles. Since the heat fusion layer expands during fusion, the self-fusing insulated electric wire can be properly fused to another adjacent object.

The organic solvent is not particularly limited as long as it is a volatile organic solvent, and examples thereof include cyclohexanone and solvent naphtha. When the resin composition contains the organic solvent, the resin composition can be suitably used as a resin varnish.

A lower limit of an elastic modulus $E1$ at 60° C. in a state before curing treatment of the resin composition is 0.5 MPa, and may be 1.0 MPa. An upper limit of elastic modulus $E1$ is 15 MPa, and may be 10 MPa.

A lower limit of an elastic modulus $E2$ at 100° C. in a state before curing treatment of the resin composition is 0.05 MPa, and may be 0.1 MPa. An upper limit of elastic modulus $E2$ is 2.0 MPa, and may be 1.0 MPa.

When elastic moduli $E1$ and $E2$ are within the above respective ranges, heat fusion layer 4 having an more excellent insulating property after fusion can be formed. Elastic moduli $E1$ and $E2$ refer to values measured in a temperature range of 20° C. to 150° C. at a heating rate of 10° C./min using a dynamic viscoelasticity measuring device (DMS) ("EXSTAR DMS6100" manufactured by Hitachi High-Tech Science Corporation).

A lower limit of a viscosity of the resin composition at 60° C. may be 1,000 mPa·s. An upper limit of the viscosity of the resin composition at 60° C. may be 50,000 mPa·s. The viscosity of the resin composition refers to a value measured with a B-type viscometer after a sample is adjusted to be at a temperature of 60° C.

Self-fusing insulated electric wire 1 is processed into, for example, a coil, a wire harness, or the like. The coil, wire harness, and the like after processing are subjected to curing treatment. The curing treatment is a heating treatment for curing the resin composition constituting heat fusion layer 4 in a state in which the resin composition is fused to another adjacent object. This heat treatment allows heat fusion layers 4 of self-fusing insulated electric wires 1 to adhere to a core of the coil, or allows heat fusion layers 4 of a plurality of self-fusing insulated electric wires 1 to adhere to each other.

<Wire Bundle>

Figure 3:
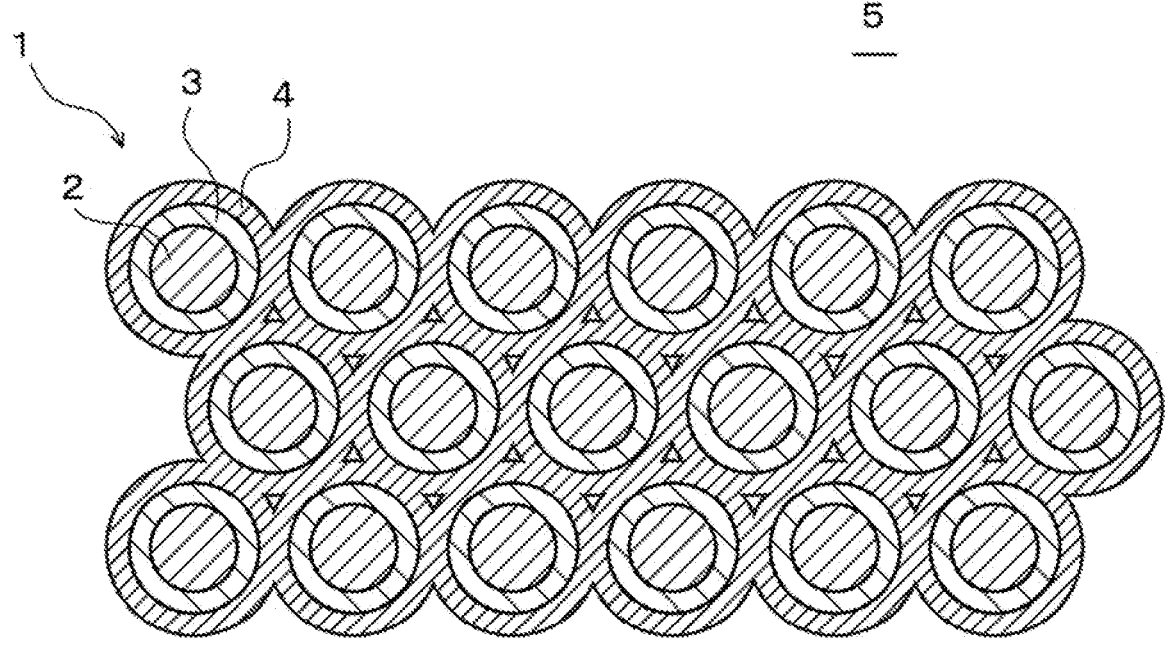
FIG. 3 is a schematic cross-sectional view illustrating a wire bundle formed by a self-fusing insulated electric wire according to an embodiment of the present disclosure.
Figure 4:
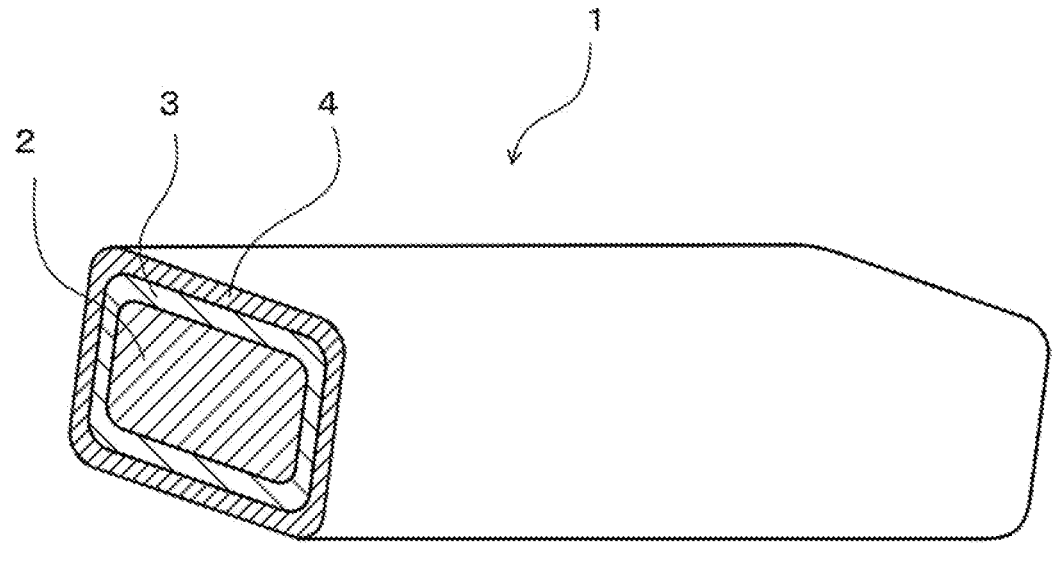
FIG. 4 is a perspective view illustrating a self-fusing insulated electric wire according to another embodiment of the present disclosure.
Figure 5:
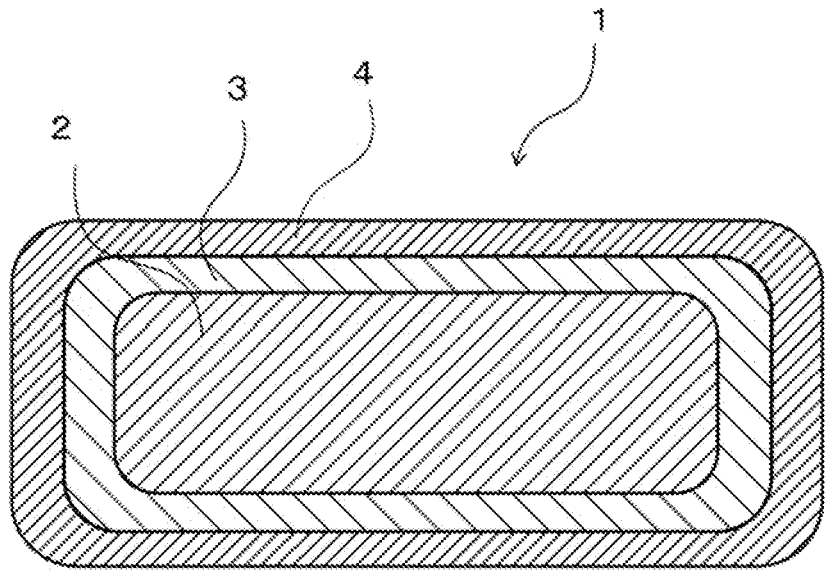
FIG. 5 is a schematic cross-sectional view illustrating a self-fusing insulated electric wire according to another embodiment of the present disclosure.
Figure 6:
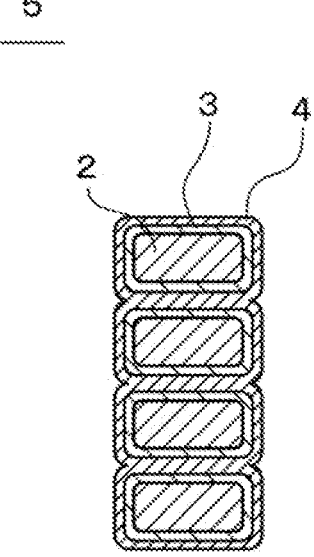
FIG. 6 is a schematic cross-sectional view illustrating a wire bundle formed by a self-fusing insulated electric wire according to another embodiment of the present disclosure.

In wire bundle 5 shown in FIGS. 3 and 6, two or more self-fusing insulated electric wires 1 are fixed to each other with heat fusion layer 4 interposed therebetween. The number of self-fusing insulated electric wires 1 forming wire bundle 5 is not particularly limited. In the cross-sectional views of wire bundle 5 of FIGS. 3 and 6, self-fusing insulated electric wire 1 may be further provided in a longitudinal direction and a transverse direction of wire bundle 5.

Since wire bundle 5 is formed using self-fusing insulated electric wires 1, wire bundle 5 exhibits an excellent insulation property.

[Other Embodiments]

It should be understood that the embodiments disclosed herein are illustrative and non-restrictive in all respects. The scope of the present disclosure is not limited to the configurations of the embodiments described above, but is defined by the claims, and is intended to include all modifications within the meaning and scope equivalent to the claims.

EXAMPLES

Hereinafter, the present disclosure will be described specifically based on examples, but the present disclosure is not limited to these examples in any respect.

<Preparation of Resin Composition>

Self-fusing resin compositions of Nos. 1 to 20 were prepared using the following materials.

(Phenoxy Resin)

Bisphenol S phenoxy, bisphenol A phenoxy, and bisphenol F phenoxy were used as monomers of bisphenols used for synthesizing a phenoxy resin. In Table 1 shown below, these materials are indicated as "Bis S", "Bis A", and "Bis F", respectively, and the composition ratio is expressed such that the total of these materials becomes 100. The weight-average molecular weight and the viscosity at 60° C. of the phenoxy resin were measured in accordance with the following methods. The results are shown in Table 1 below together with the solid content concentration of the phenoxy resin solution.

[Weight-Average Molecular Weight]

The weight-average molecular weight of the phenoxy resin was measured using an "eAliance GPC System (e2695)" manufactured by Waters Corporation. A "WATERS GURAD COL DMF" as a guard column, and a "WATERS STYRAGELHR4E/HRSE" connected in series as a separation column were used. Using N-methyl-2-pyrrolidone (NMP) as a developing solvent, the measurement was performed at a column temperature of 40° C. and a flow rate of 0.5 mL/min to determine the weight-average molecular weight as a molecular weight in terms of standard polystyrene.

[Viscosity]

The viscosity of the resin composition was measured using a B-type viscometer after a sample was adjusted to be at a temperature of to 60° C.

(Curing Agent)

As a curing agent, dicyandiamide manufactured by Nippon Carbide Industries Co., Inc. was used.

(Blowing Agent)

As a blowing agent, a thermally expandable microcapsule ("FN-180SD" manufactured by Matsumoto Yushi-Seiyaku Co., Ltd.) was used. The blowing agent was added in an amount of 10 parts by mass relative to 100 parts by mass of the phenoxy resin for the resin compositions of Nos. 13, 14, and 18.

<Production of Self-Fusing Insulated Electric Wire>

An insulating layer having an average thickness of 60 μm and a heat fusion layer having an average thickness of 20 μm were laminated in this order on an outer peripheral surface of a round copper wire having a diameter of 1.0 mm to produce a self-fusing insulated electric wire. Polyimide was used as a material for forming an insulating layer. The self-fusing resin compositions of Nos. 1 to 20 were used as materials for forming the heat fusion layer.

Elastic moduli and partial discharge inception voltages (PDIV) of the prepared self-fusing insulated electric wires were measured in accordance with the following methods. The results are shown in Table 1 below.

[Elastic Modulus]

The elastic modulus was measured using a dynamic viscoelasticity measuring device (DMS) ("EXSTAR DMS6100" manufactured by Hitachi High-Tech Science Corporation) in a temperature range of 20° C. to 150° C. at a heating rate of 10° C./min for a tubular insulating layer obtained by removing a conductor from the self-fusing insulated electric wire.

[PDIV]

A voltage at which discharge of 50 pC or more continued for 3 seconds was taken as the partial discharge inception voltage (PDIV) when an AC voltage was charged to both ends of two self-fusing insulated electric wires twisted together to increase a voltage at 10 V/second. The PDIV may be evaluated as "good" when the measured value is 1340 Vp or more, and as "poor" when the measured value is less than 1340 Vp.

TABLE 1

| No. | Monomer composition ratio Bis S | Bis A | Bis F | Weight-average molecular weight | Solid content concentration (mass %) | Viscosity (mPa · s @60° C.) | Elastic modulus before curing treatment (MPa) 80° C. | 100° C. | PDIV (Vp) |
|---|---|---|---|---|---|---|---|---|---|
| 1 | 50 | 50 | 0 | 40200 | 28.0 | 2000 | 2.2 | 0.30 | 1360 |
| 2 | 50 | 50 | 0 | 55000 | 28.2 | 3800 | 2.3 | 0.35 | 1370 |
| 3 | 50 | 50 | 0 | 73500 | 28.8 | 8400 | 2.5 | 0.36 | 1360 |
| 4 | 50 | 50 | 0 | 95600 | 28.4 | 18700 | 2.5 | 0.37 | 1340 |
| 5 | 25 | 75 | 0 | 41400 | 28.1 | 2200 | 1.8 | 0.28 | 1380 |
| 6 | 25 | 75 | 0 | 92600 | 28.3 | 16700 | 1.9 | 0.30 | 1390 |
| 7 | 75 | 25 | 0 | 40500 | 28.5 | 2400 | 6.3 | 0.80 | 1350 |
| 8 | 75 | 25 | 0 | 89300 | 28.4 | 17200 | 6.4 | 0.85 | 1360 |
| 9 | 50 | 25 | 25 | 43000 | 29.0 | 2410 | 1.5 | 0.20 | 1350 |
| 10 | 50 | 25 | 25 | 94100 | 29.8 | 17900 | 1.6 | 0.20 | 1340 |
| 11 | 50 | 0 | 50 | 41500 | 30.6 | 2600 | 1.3 | 0.15 | 1350 |
| 12 | 50 | 0 | 50 | 89600 | 30.1 | 18200 | 1.4 | 0.16 | 1340 |
| 13 | 50 | 50 | 0 | 40200 | 30.8 | 2800 | 2.0 | 0.26 | 1500 |
| 14 | 50 | 50 | 0 | 72500 | 30.1 | 9100 | 2.1 | 0.26 | 1510 |
| 15 | 50 | 50 | 0 | 38100 | 28.1 | 1900 | 2.1 | 0.28 | 1310 |
| 16 | 25 | 75 | 0 | 37900 | 28.3 | 2050 | 1.1 | 0.25 | 1315 |
| 17 | 75 | 25 | 0 | 39100 | 28.5 | 2250 | 6.0 | 0.80 | 1300 |
| 18 | 50 | 0 | 50 | 37200 | 30.1 | 2200 | 1.2 | 0.13 | 1290 |
| 19 | 15 | 85 | 0 | 62000 | 28.6 | 7700 | 0.8 | 0.15 | 1300 |
| 20 | 85 | 15 | 0 | 60500 | 28.2 | 6900 | 19.0 | 2.30 | 1310 |

From the results shown in Table 1, when the resin compositions of Nos. 1 to 14 were used, the PDIVs were higher than those when the resin compositions of Nos. 15 to 20 were used.

REFERENCE SIGNS LIST 1 self-fusing insulated electric wire
2 conductor
3 insulating layer
4 heat fusion layer
5 wire bundle

The invention claimed is:

1. A resin composition comprising
60 to 85 mass % of a phenoxy resin, and
15 to 40 mass % of at least one additional component comprising a blowing agent,
wherein
the phenoxy resin has a weight-average molecular weight of 40,000 or more,
the phenoxy resin has, in the same or different molecules, a first structural unit derived from bisphenol S phenoxy, a second structural unit derived from a bisphenol A epoxy and a bisphenol F epoxy, and
a content ratio of the first structural unit in the phenoxy resin is 20 mol % to 80 mol % relative to a total content of the first structural unit and the second structural unit constituting the phenoxy resin.

2. The resin composition according to claim 1, having an elastic modulus E1 at 60° C. in a state before curing treatment of 0.5 MPa or more and an elastic modulus E2 at 100° C. in a state before curing treatment of less than 2.0 MPa.

3. The resin composition according to claim 2, further comprising an organic solvent.

4. A self-fusing insulated electric wire comprising a linear conductor, an insulating layer covering an outer peripheral surface of the conductor, and a heat fusion layer covering an outer peripheral surface of the insulating layer, wherein the heat fusion layer is composed of the resin composition according to claim 3.

5. A self-fusing insulated electric wire comprising a linear conductor, an insulating layer covering an outer peripheral surface of the conductor, and a heat fusion layer covering an outer peripheral surface of the insulating layer, wherein the heat fusion layer is composed of the resin composition according to claim 2.

6. A wire bundle comprising two or more self-fusing insulated electric wires fixed through a heat fusion layer, wherein the self-fusing insulated electric wires are each the self-fusing insulated electric wire according to claim 5.

7. The resin composition according to claim 1, further comprising an organic solvent.

8. A self-fusing insulated electric wire comprising a linear conductor, an insulating layer covering an outer peripheral surface of the conductor, and a heat fusion layer covering an outer peripheral surface of the insulating layer, wherein the heat fusion layer is composed of the resin composition according to claim 7.

9. A wire bundle comprising two or more self-fusing insulated electric wires fixed through a heat fusion layer, wherein the self-fusing insulated electric wires are each the self-fusing insulated electric wire according to claim 8.

10. A self-fusing insulated electric wire comprising a linear conductor, an insulating layer covering an outer peripheral surface of the conductor, and a heat fusion layer covering an outer peripheral surface of the insulating layer, wherein the heat fusion layer is composed of the resin composition according to claim 1.

11. A wire bundle comprising two or more self-fusing insulated electric wires fixed through a heat fusion layer, wherein the self-fusing insulated electric wires are each the self-fusing insulated electric wire according to claim 10.

* * * * *